July 2, 1929.  L. J. FREISS  1,719,217
BLADE CARRIER
Filed Dec. 2, 1926

Inventor
Louis J. Freiss
By his Attorney

Patented July 2, 1929.

1,719,217

UNITED STATES PATENT OFFICE.

LOUIS JOSEPH FREISS, OF BROOKLYN, NEW YORK.

BLADE CARRIER.

Application filed December 2, 1926. Serial No. 152,080.

This invention relates to a device for holding a blade, and the object thereof is to produce a cheap and an efficient blade-holder having a minimum number of parts, of simple construction, and adapted either to house the carried blade so as to prevent accidents when not in use, or to grip or lock the blade in any adjusted cutting or scraping position with the blade-edge either longitudinally of the holder or crosswise thereof. The form of holder illustrated in the accompanying drawings is exceedingly cheap, strong, light in weight, and efficient. Such illustrated form is shown as employing a thin blade, of the kind used with the Gillette-type of razor, although any other suitable blade may be used. In practice, and more particularly when the device is to be used as a scraper, the blade may be a safety-razor blade that had already been used for shaving.

Figure 1:
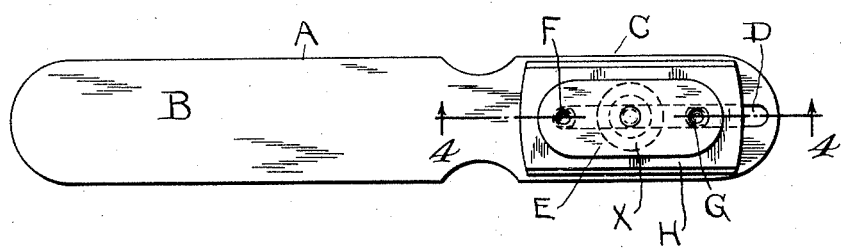
Figure 2:
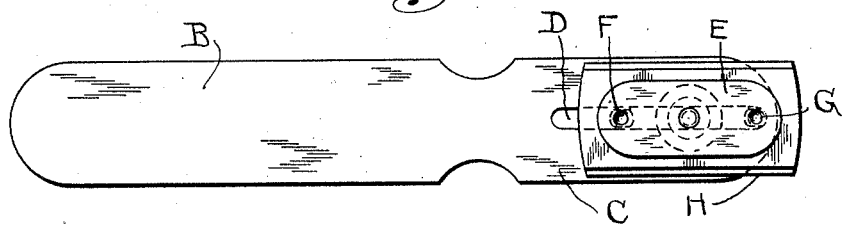
Figure 3:
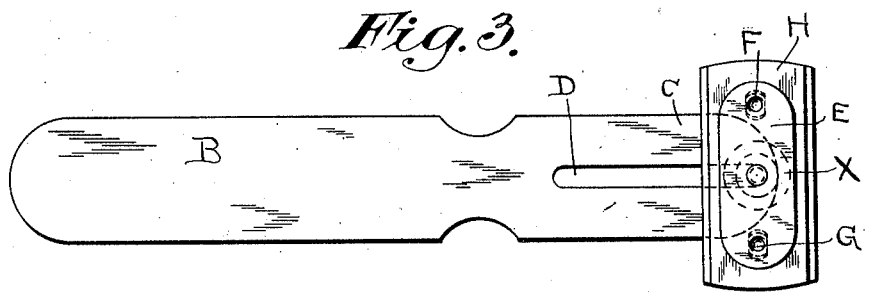
Figure 4:

Referring to the accompanying drawings, Fig. 1 is a plan view of a form of my new device, showing the blade retracted to housed or non-cutting position; Fig. 2 is a plan view, showing the blade advanced to its extreme cutting position. Fig. 3 shows the carrier arranged to hold the blade crosswise of the holder, especially for scraping. Fig. 4 illustrates a longitudinal section at the line 4—4 of Fig. 1.

In the form illustrated in the accompanying drawings, my new device comprises a main-plate, a blade-carrier adjustably connected with said main-plate, and a lock or clamp. The purpose of such lock or clamp is to grip a cutting or scraping blade at any adjusted position to the device.

The same reference characters indicate the same parts in all of the accompanying drawings.

A indicates the main-plate, shown as formed of a flat piece of metal, having a forward part, B, and a rearward part, C, constituting a handle. The forward part is shown as having a slot, D, longitudinal thereof.

E indicates the carrier, also made of sheet metal and provided with two equidistant depressions which thus form projections F and G, hereinafter called blade-engaging projections. The carrier also has a threaded opening, H, through the same, midway of its two ends and of its two side-edges.

In the illustrated form, the carrier is wider than the slot, D, of the main-plate, and the mentioned projections, F and G, slidably fit within such slot.

A locking-screw X has its threaded shank fitting the threaded opening, H, of the carrier, and also has a head which is wider than the slot D. As a consequence of turning the screw, either in one direction or the other, the carrier is clamped to or is freed from the main-plate. Obviously, it may be adjusted, by sliding, to any retracted or advanced position.

The form of my device shown in the drawings is particularly intended to hold a wafer-blade of the Gillette-type. A used shaving-blade may be employed.

As shown the blade-engaging projections F and G of the carrier pass through the end openings of the blade while the shank of the locking screw X passes through the middle opening of the blade.

It will be seen that when the device is not in use, for instance when carried in the pocket, the blade is housed against possibility of accidental cutting of the hand of a user, and the opposite edges of the blade are also protected against striking against any surface or being struck by any object. This double protection is due to the fact that the blade is narrower than is the holder, as shown in Figure 1, in which illustrated position the locking screw, X, is tightened, and the wafer-blade, I, is forced closely against the main plate. The blade is, at all times, clamped between the overlapping carrier, E, and the inner edges of the slot D, this relative arrangement of the parts being the same not only when the blade is retracted to housed position but also when advanced so as to be in any longitudinal cutting position.

The position of the blade for cutting, will be determined by the work to be done, particularly by the depth of the cut to be made. For instance, the carrier may be advanced, as shown in Fig. 2, to an extreme forward position, and then be useful for cutting through thick or heavy material or through a number of plies or sheets. A device of the kind illustrated may be used for opening a large carton or pasteboard box which contains a number of smaller boxes, in which case the blade may be locked in such position as to expose only enough of the blade to cut through the material of the outer carton and yet not touch or injure the smaller boxes.

One of the uses for which my new device has been especially designed is as a scraper, particularly to be used in removing tabs from the glass of a show-window or for removing adherent portions of sales-notices from such surfaces. My new device is also especially useful for removing dried glue, paint and stains from surfaces. Heretofore, when scraping has been taken advantage of, the work has usually been done with the aid of a used razor blade, with the result that the workman has often cut his fingers or hand. By the use of my device, this danger is avoided, since the handle may be firmly grasped, and any desired pressure may be applied to the razor-blade, so as to quickly and cleanly scrape a surface. In Figure 3, I have shown the position of the carrier and of the blade for scraping. The screw has been unlocked, the carrier and blade turned crosswise of the main-plate, so as to have the projections F and G straddling and preferably in touch with the forward end of the plate, and the screw then locked tight.

It is obvious that, in the illustrated arrangement, both blade-edges may be used. In the position shown in Figures 1—3, either cutting-edge may be used without disturbing or unlocking the blade.

Attention is particularly called to the fact that the blade-carrier may be adjusted to and locked at any desired position, and is not restricted, as in holders heretofore proposed, to only a few predetermined positions which correspond to openings or notches.

While I have shown and described one particular embodiment of my invention, I desire that it shall be understood that my improvements may be embodied in other forms or arrangements and still be within the scope of my claims.

What I claim is:

1. A blade-holder comprising a main-plate having a slot longitudinally thereof, a blade-carrier adjustably connected with the main-plate and having a plurality of projections formed to fit openings of a blade and to slidably fit said slot, and a clamp having a portion thereof formed to pass through an opening of a blade and also through said slot.

2. A blade-holder comprising a main-plate, a blade-carrier movably connected with said main-plate and having blade-engaging projections positioned to straddle and engage the forward end of the main-plate when the carrier is crosswise thereof, and means for clamping said carrier in any adjusted blade-holding position.

In testimony whereof, I have signed my name to this specification, this 29th day of November, 1926.

LOUIS JOSEPH FREISS.